(12) United States Patent
Ambs et al.

(10) Patent No.: US 6,415,908 B1
(45) Date of Patent: Jul. 9, 2002

(54) ROPE ASSEMBLY FOR MECHANICAL CONVEYORS

(75) Inventors: Richard W. Ambs, Williamsport; Steven S. Kelchner, South Williamsport, both of PA (US)

(73) Assignee: The Young Industries, Inc., Muncy, PA (US)

( * ) Notice: Subject to any disclaimer, the term of this patent is extended or adjusted under 35 U.S.C. 154(b) by 0 days.

(21) Appl. No.: 09/483,308

(22) Filed: Jan. 14, 2000

(51) Int. Cl.$^7$ ............................................... B65G 19/14
(52) U.S. Cl. ........................................ 198/716; 198/733
(58) Field of Search .................................. 198/716, 533, 198/733, 550.11, 550.01, 725

(56) References Cited

U.S. PATENT DOCUMENTS

| | | | | |
|---|---|---|---|---|
| 5,186,312 A | * | 2/1993 | Ambs et al. | 198/716 |
| 5,865,296 A | * | 2/1999 | Angus | 198/716 |

* cited by examiner

Primary Examiner—Kenneth W. Noland
(74) Attorney, Agent, or Firm—Stevens, Davis, Miller & Mosher, LLP

(57) ABSTRACT

A rope assembly for a mechanical bulk material conveyor generally consisting of a continuous rope adapted to be trained about a pair of sprockets within the conveyor, a rope ends connecting flight and a plurality of intermediate flights secured to and spaced along the rope at intervals, each of such intermediate flights including a ferrule having a tubular section receiving a portion of the rope therethrough and being firmly secured thereto and an annular flange section, a disc member having an opening receiving a portion of the rope therethrough, a boss member having an opening receiving a portion of the rope therethrough, the opening in at least one of the disc and boss members having a first enlarged section receiving a portion of the ferrule tubular section therein and a second enlarged section receiving at least a portion of the ferrule flange section therein, and means for firmly securing the disc and boss members together with the ferrule interposed therebetween. The flange section of each ferrule is provided with an annular groove for receiving and guiding the blade of a cutting tool, thereby assuring a severance of the ferrule at its midpoint, a severance along a plane disposed perpendicular to the longitudinal axis of the rope receiving opening in the ferrule and a minimal amount of metal to be cut through.

23 Claims, 3 Drawing Sheets

ROPE ASSEMBLY FOR MECHANICAL CONVEYORS

This invention relates to bulk material conveyors and more particularly to a rope assembly for a mechanical bulk material conveyor. The invention further provides for a disc assembly for such a rope assembly and a ferrule used in such disc assembly configured to facilitate the severing of such rope assembly in splicing sections of the rope.

BACKGROUND OF THE INVENTION

Mechanical bulk material conveyors are well known in the prior art and are used for mechanically conveying various types of bulk materials such as grains, powders, pellets, chips, flakes and the like. Generally, they consist of a lower housing assembly usually provided with a material feeding means, an upper housing assembly usually having a material discharge means, a pair of tubular members interconnecting the housing assemblies to provide a circuitous path through the apparatus, and a rope assembly provided with a plurality of spaced flights of discs, disposed along the circuitous path of the apparatus. The rope assembly is adapted to be driven at high speeds so that the flights of discs function to displace volumes of both air and bulk material fed into the lower assembly. The displacement of the air along with the material being conveyed has the effect of fluidizing the material being conveyed which not only facilitates the material displacement but provides for a smooth and efficient conveying process. An example of such a conveyor is illustrated and described in U.S. Pat. No. 5,186,312.

In the type of conveyor described, there further is provided at least a pair of sprockets disposed in the housing assemblies about which the endless rope assembly is trained. Typically, such sprockets are provided with circumferentially spaced recesses which are adapted to receive the spaced flights of the rope assembly as the rope passes about each sprocket. The rope assembly typically consists of an endless rope provided with a plurality of ferrules spaced along and firmly secured to the rope, with each of such ferrules being provided with a pair of disc and boss members engaging outwardly facing surfaces of the ferrule and secured together.

In the use of the type of rope assemblies described, one mode of failure experienced when using a simple cylindrically configured ferrule has been the pulling through of the ferrule out of the end of a disc assembly typically formed of a plastic material, attributable to the application of a large force on a small cross-sectional area. To remedy such problem, such ferrules have been redesigned to provide an annular flange and correspondingly or greater cross-sectional area. While eliminating the problem of the ferrule being pulled out of its associated disc assembly, the use of such a flanged configuration has resulted in a new problem when the rope of the assembly is required to be spliced to replace a failed section of the rope.

Splicing of a rope in such assemblies requires severing through the rope at one of its attached ferrules, at a right angle through the ferrule and rope, at the ferrule's midpoint where the narrow annular flange normally is positioned. Because of the narrow width of the annular flanged section of the ferrule, it is difficult to accurately cut through the center of the flange section using simple hand tools without a guide fixture to insure an accurate cut at the midpoint of the annular flange and at a precise right angle to the rope axis required for the splicing operation.

In view of the foregoing, it is the principal object of the present invention to provide a rope assembly for a mechanical bulk material conveyor of the type described which not only provides for preventing the ferrule of a disc assembly from pulling through the associated disc members of such assembly upon the application of a severe force but further provides for such an assembly which may be easily and precisely cut through at a midpoint thereof in the removal of failed section of such rope assembly and the splicing of a new section therein.

DESCRIPTION OF THE PREFERRED EMBODIMENTS OF THE INVENTION

Figure 1:
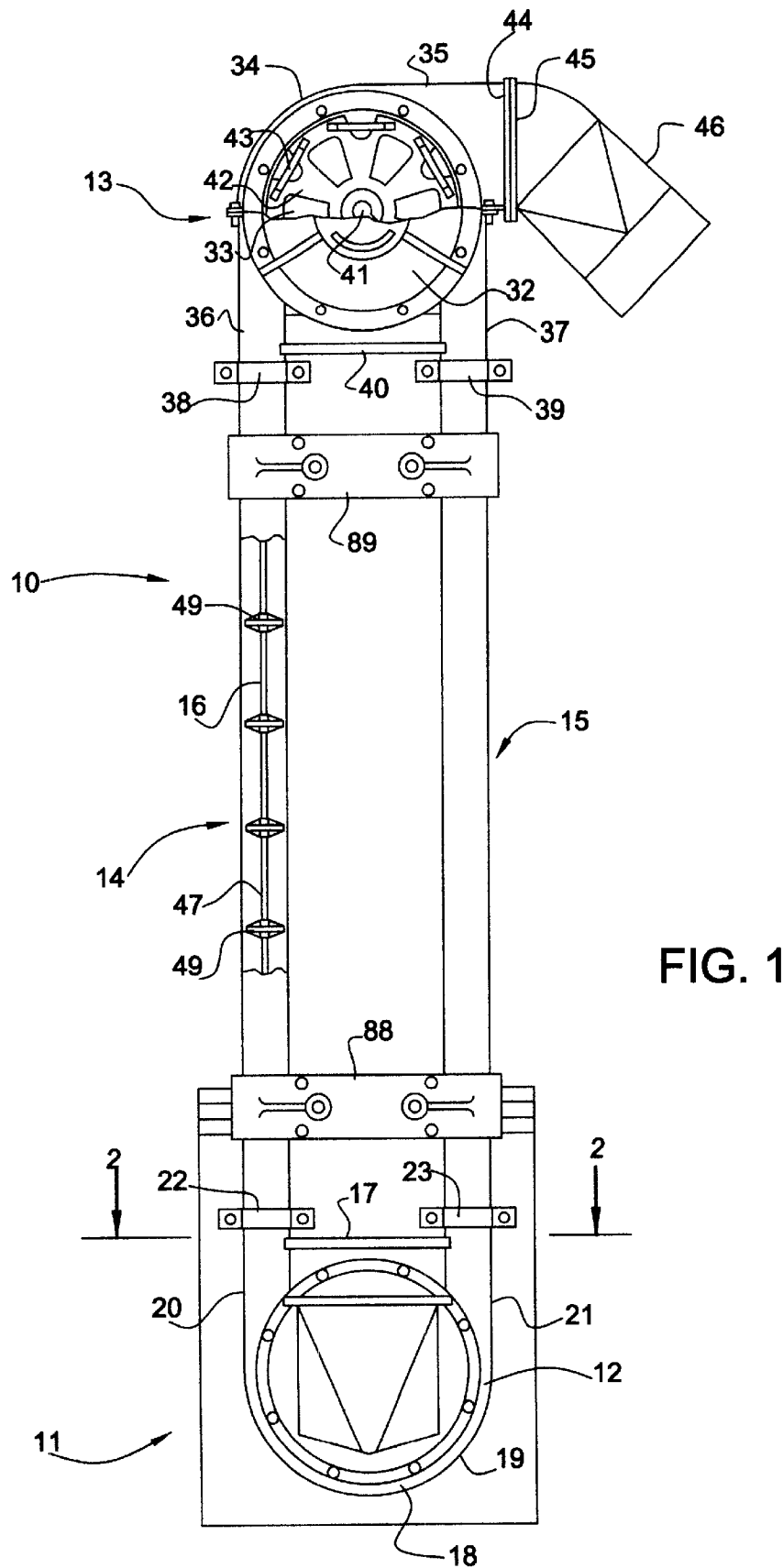
FIG. 1 of the drawings is a side elevational view of a mechanical bulk material conveyor embodying the present invention, having portions thereof broken away.
Figure 2:
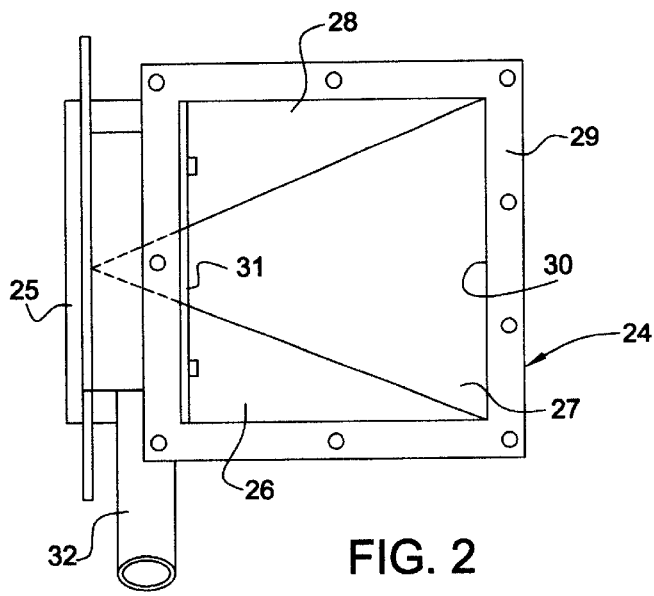
FIG. 2 is an enlarged cross-sectional view taken along line 2—2 in FIG. 1.
Figure 3:
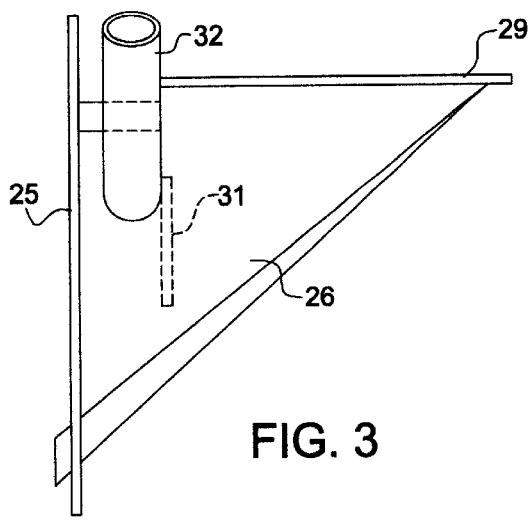
FIG. 3 is a side elevational view of the hopper shown in FIG. 2.
Figure 4:
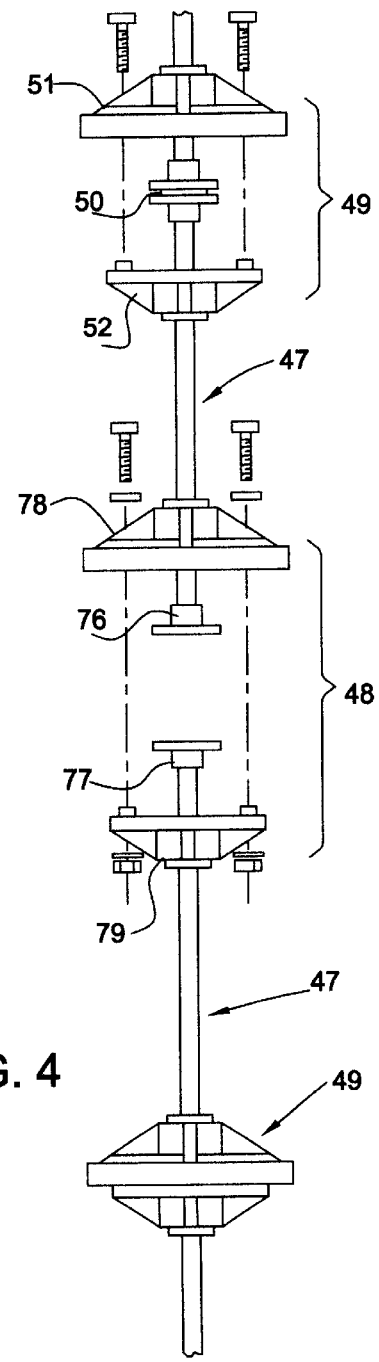
FIG. 4 is an enlarged view of a segment of the rope assembly utilized in the embodiment shown in FIG. 1, illustrating the components of an end and intermediate flights thereof in exploded relation.

Referring to FIGS. 1 through 3 of the drawings, there is illustrated a conveyor 10 embodying the present invention which includes a base unit 11, a lower housing assembly 12, an upper housing assembly 13, a pair of tubular members 14 and 15 interconnecting the upper and lower housing assemblies to provide a circuitous path, and an endless rope assembly 16 disposed within housing assemblies 12 and 13 and tubular members 14 and 15, along the circuitous path. Base unit 11 provides a support for the conveyor and is provided with a motor operatively connected to a drive sprocket in the lower housing assembly to drive the rope assembly at speeds in the order of 720 feet per minute.

Lower housing assembly 12 is mounted on base unit 11 and includes an upper wall 17, a semi cylindrical lower wall 18, an outer side wall 19 and a pair of upwardly projecting tubular portions 20 and 21 disposed tangentially relative to lower wall 18, communicating with tubular members 14 and 15 and connected thereto by means of a pair of clamps 22 and 23. Disposed within lower housing 12 and mounted on a drive shaft extending therein from base unit 11 is a drive sprocket provided with a circular surface about which a lower segment of the rope assembly is trained and a plurality of circumferentially spaced recesses for receiving the flights of the segment of the rope assembly trained about the lower portion of the sprocket.

As best shown in FIGS. 2 and 3, a hopper 24 is mounted on lower housing 12. The hopper includes a mounting plate 25 mounted on outer side wall 19, having an opening communicating through an opening in wall 19 with the interior of assembly 12, and a set of triangularly shaped side walls 26, 27 and 28 provided with a peripheral mounting flange 29 at the upper ends thereof defining a material inlet opening 30. Depending from the inner side of inlet opening 30 is a vertically adjustable baffle plate 31 which may be adjusted vertically to adjust the flow of material through the hopper into the lower end of assembly 12. Air trapped in the hopper may be vented through a vent pipe 32 provided on side wall 26. It will be appreciated that bulk material gravity fed into the hopper through inlet opening 30 will be caused to slide downwardly along side walls 26, 27 and 28 and enter housing 12 through the opening in mounting plate 19.

Upper housing assembly 13 is substantially similar in construction to the lower housing assembly and generally includes a pair of side walls 32 and 33, a rounded upper wall 34 having a laterally projecting, tangentially disposed discharge conduit 35, a pair of downwardly projecting, tangentially disposed tubular portions 36 and 37 communicating with the upper ends of tubular members 14 and 15 and connected thereto by means of a pair of clamps 38 and 39 and a bottom wall 40. Journaled in bearings provided in side wall 32 or 33 is a shaft 41 on which there is mounted an idler sprocket 42. Sprocket 42 is similar in construction to the drive sprocket disposed in the lower housing assembly and includes a circular surface about which an upper segment of the rope assembly is trained, and a plurality of circumferentially spaced recesses which are adapted to receive the spaced flights of the segment of the rope assembly trained over the upper portion of the sprocket. As shown in FIG. 1, the sides of sprocket 42 are provided with sets of straps or brackets 43, each of which are rigidly secured to the sprocket and span a socket to laterally restrain a flight of the rope assembly received within a recess in the socket. The outer end of laterally projecting conduit portion 35 is provided with a peripheral mounting flange 44 to which there is secured the mounting flange 45 of a spout member 46.

Figure 5:
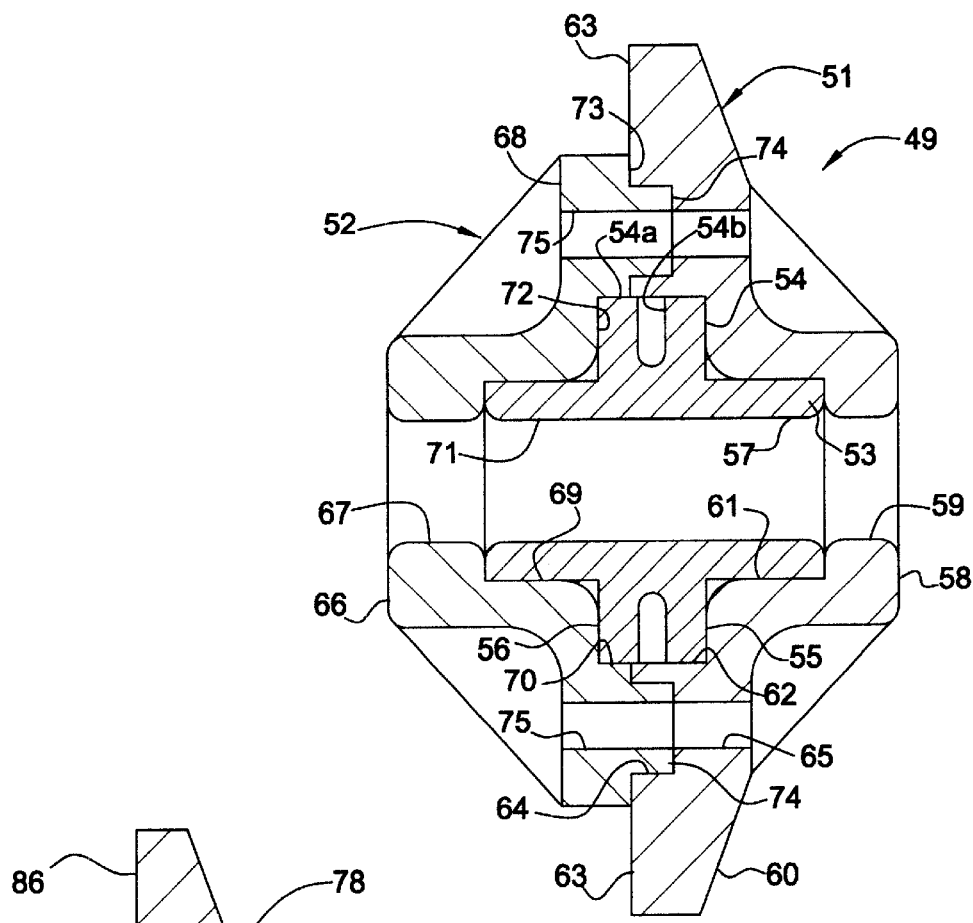
FIG. 5 is an enlarged, vertical cross-section of one of the intermediate flights shown in FIG. 4, illustrated in an assembled condition.

The rope assembly is disposed along the circuitous path defined by the upper and lower assemblies and is trained at its lower end about the drive sprocket in the lower assembly and at its upper end about sprocket 42. The rope assembly consists of a rope 47 which is trained around the drive and idler sprockets, an end disc assembly 48 which secures opposing ends of the rope together and is adapted to be received within the recesses in the peripheries of the sprockets, and a plurality of intermediate disc assemblies 49 spaced along the rope and also adapted to be received within the recesses in the peripheries of the sprockets. Rope 47 consists of a steel wire rope which may be nylon coated, having bare end portions secured together by disc assembly 48. As best shown in FIG. 5, each of disc assemblies 49 includes a ferrule 50 firmly secured to rope 47, a disc member 51 mounted on the rope and engaging the ferrule and a boss member 52 also mounted on the rope, engaging an opposite side of the ferrule and engaging and being secured to the disc member with the ferrule interposed therebetween. Ferrule 50 is formed of a metal such carbon steel, stainless steel or aluminum, and includes a tubular section 53 and an annular flange section 54 disposed intermediate the ends of tubular section 53 and providing oppositely facing, annular surfaces 55 and 56. The ferrule receives a portion of rope 47 through its longitudinal opening 57 and is firmly secured thereto by means of crimping or swaging. Annular end surface 54a of flange section 54 is formed with an annular recess 54b which is disposed equidistantly from the ends of tubular section 53 and is substantially perpendicular to the axis of opening 57. The width of the recess is sufficient to permit the insertion and guidance of the blade of a cutting tool for severing the ferrule in halves.

Disc member 51 is formed of a thermoplastic material such as nylon, polyurethane or polyester material and includes a hub section 58 having a rope receiving opening 59 therein and a flange section 60. Rope receiving opening 59 is provided with a first enlarged section 61 for receiving an end portion of ferrule tubular section 53 which abuts against an annular shoulder of the first enlarged opening section, and a second enlarged section 62 which receives a portion of flange section 54 of the ferrule with annular bearing surface 55 thereof engaging the annular end surface of second enlarged opening section 62. The side of flange section 60 opposite the side of hub section 58 is provided with an annular mating surface 63 having a plurality of circumferentially spaced alignment recesses 64, relative to the axis of rope receiving opening 59. The flange section of the disc member further is provided with a plurality of circumferentially spaced rivet holes 65 aligned with alignment recesses 64.

Each of the boss members is also formed of a thermoplastic material such as nylon, polyurethane or polyester material and consists of a hub section 66 having a rope receiving opening 67 therethrough and a flange section 68. Rope receiving opening 67 is provided with a first enlarged section 69 and a second enlarged section 70. An end portion 71 of the ferrule tubular section 53 is received within first enlarged opening section 69 with the end portion thereof engaging the annular shoulder thereof, and a portion of ferrule flange section 54 is received in second enlarged opening section 70 with annular bearing surface 56 of the flange section engaging annular surface 72 of second enlarged opening section 70. Annular inner surface 73 of flange section 68 is provided with a plurality of circumferentially spaced protuberances 74 which are adapted to be received in alignment recesses 64 of flange section 60 when the assembly is in the assembled condition as shown in FIG. 5, with annular surface 73 of the boss member engaging annular surface 63 of the disc member in mating relation. Flange section 68 further is provided with a plurality of circumferentially spaced rivet holes 75 which are adapted to align with rivet holes 65 in the disc member when guide protuberances 74 are received in alignment recesses 64, as shown in FIG. 5. It will be appreciated that the disc and boss members of each of disc assemblies 49 will be firmly secured together and to the rope by means of rivets inserted through the aligned holes of the members, with the ferrule interposed therebetween and firmly secured to the rope.

Although each of the intermediate disc assemblies 49 has been described with each of the disc and boss members having an enlarged section for receiving the flange section of the ferrule, it is contemplated that such members may be formed with both of the members having second enlarged opening sections for receiving the flange section of the ferrule as shown in FIG. 5 or either of such members be formed with a second enlarged opening section for receiving the flange section of the ferrule. In any of such embodiments, there is provided annular bearing surfaces of the disc and boss members which engage mating annular surfaces of the flange section of the ferrule providing substantial bearing surfaces which function to prevent an overriding of the disc and boss members of the assembly over the ferrule.

Each of the end disc assemblies includes a pair of end ferrules 76 and 77, each firmly secured to an end of rope 47, a disc member 78 mounted on the rope and receiving end ferrule 76 and a boss member 79 mounted on the other end of the rope and receiving end ferrule 77 therein. When the end disc assembly is in the assembled condition, end ferrules 76 and 77 are disposed in abutting relation within disc and boss members 78 and 79, respectively, and the disc and boss members are secured together with the abutting end ferrule members interposed therebetween.

Figure 6:
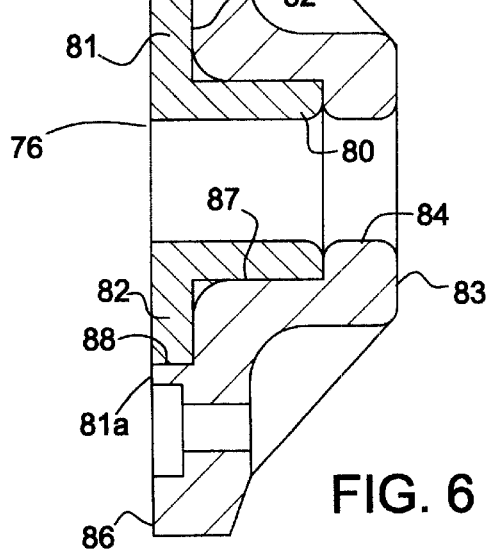
FIG. 6 is an enlarged, vertical cross-sectional view of one part of an end flight of the assembly shown in FIG. 4, illustrating the components thereof in an assembled condition.

Ferrules 76 and 77 are substantially identical in configuration and also are formed of a metal such as carbon steel, stainless steel or aluminum. They are firmly secured to bare end portions of the wire rope by crimping or swaging. As best shown in FIG. 6, ferrule 76 includes a tubular section 80 adapted to receive an end portion of the rope therein to which it is firmly secured, and a flange portion 81 providing an annular bearing surface 82. Disc member 78 is similar in configuration, composition and function to disc member 51, including a hub section 83 having a rope receiving opening 84 and a flange section 85 providing an annular mating surface 86. Rope receiving opening 84 is provided with a first enlarged section 87 and a second enlarged section 88. First enlarged opening section 87 is adapted to receive ferrule tubular section 80 therein with the annular end wall thereof engaging the annular shoulder of the first enlarged opening section, and the second enlarged opening section is adapted to receive ferrule flange section 81 of ferrule 76 with annular surface 82 of ferrule flange section 81 engaging the annular shoulder of the second enlarged opening section therein. As in the assembly shown in FIG. 5, the enlarged bearing surface provided by annular surface 82 of ferrule 76 functions to prevent the override of ferrule 76 by disc member 78.

Boss member 79 also is similar in configuration, composition and function to boss member 52 of the intermediate disc assembly shown in FIG. 5. It includes essentially a hub section for receiving a rope portion having end ferrule 77 firmly secured to a end portion of the opposite end of the rope, and a flange section engageable with and secured to a disc member as shown in FIG. 6. The opening in the hub section includes first and second enlarged sections similar to enlarged opening sections 87 and 88 in disc member 78 for receiving therein the hub and flange sections of ferrule 77.

For economy of manufacture, the disc and boss members of end assemblies 48 preferably are formed the same as the disc and boss members of intermediate disc assemblies 49. Under such circumstances, such members may be used for either end or intermediate disc assemblies and only the end ferrules need to be formed differently. Such end ferrules could be formed independently or from ferrules 50 being sawed in half by bisecting the ferrules at the flange sections thereof. It further is contemplated, however, that the second enlarged opening sections of the disc and boss members of the end disc assemblies may be of different depths or longitudinal dimensions to accommodate the flange sections of the end ferrules of different dimensions, and that the flange sections of abutting end ferrules be received within either second enlarged opening sections in both adjoining disc and boss members or in one or the other of such members. In any such embodiment, however, it further is contemplated that the ferrule be provided with an annular flange section definitely providing an annular surface disposed in a plane substantially perpendicular to the longitudinal centerline of the rope segment passing through the ferrule, engaging a disc or boss member, and with an annular guide groove, to prevent the disc boss member from overriding the associated ferrule whenever an excessive force might be applied to the rope assembly or under any other circumstances where the rope might be caused to pull the ferrule out through a disc or boss member, and to facilitate splicing of the rope.

In the manufacture of the embodiment of the invention as described, a length of steel rope is first cut to a desired dimension depending upon its particular application. An end ferrule 77 is then secured to a bare end portion of the rope by the use of a tool provided with a pair of crimping or swaging dies. An end boss member 79 and an intermediate disc member 51 are then strung onto the rope by passing the rope through the rope receiving openings therein. An intermediate ferrule 50 is then strung onto the rope and positioned at a precise distance from end ferrule 71 and then firmly secured to the rope by use of the crimping or swaging dies. The precise positioning of intermediate ferrule 50 is facilitated by passing a desired length of the rope through the crimping or swaging dies and then positioning the ferrule with annular surface 55 thereof up against a reference surface of the tool. With the ferrule thus accurately positioned, the tool is operated to crimp or swage the ferrule onto the rope. Upon completion of such operation, another set of members 52 and 51 of the intermediate die assemblies are strung onto the rope and additional intermediate ferrules are applied in the same manner until the opposite end of the rope is reached whereupon an end ferrule 76 is crimped or swaged on an opposite bare end of the rope. With the end and intermediate ferrules thus firmly secured to the rope with the disc and boss members strung on the rope between the ferrules, each set of intermediate disc and boss members are drawn and secured together with a set of rivets so that an adjoining set of intermediate disc and boss members will be firmly secured together with an intermediate ferrule interposed therebetween as shown in FIG. 5. The rope assembly is then in condition for installation in a conveyor as shown in FIG. 1.

In assembling the conveyor, the lower housing assembly is first mounted on the base unit with the drive sprocket shaft being connected to the drive motor and the hopper removed. The tubing is then connected to the lower housing assembly by means of clamps 22 and 23. The tubing is maintained in spaced apart relation by means of a pair of upper and lower tube clamps 89 and 90. With the tubes thus mounted, the upper housing assembly with a cover plate thereof removed is mounted on the other upper ends of the tubes and secured thereto by clamps 38 and 39. The conveyor is then prepared to receive the rope assembly. The unspliced rope assembly is then fed into the conveyor through the upper housing assembly so that an intermediate segment is trained around the upper sprocket and the end segments extend down through tube members 14 and 15 into the lower housing assembly. End disc and boss members 78 and 79 are then accessed through the opening in the lower housing assembly and secured together by means of a set of rivets so that the rope assembly will be trained about the upper and lower sprockets with disc assemblies received in the sprocket recesses and the rope assembly being disposed along the circuitous path provided by the upper and lower housing assemblies and the interconnecting tubular members. The hopper may then be mounted on the lower housing assembly and the cover plate may be mounted on the upper housing assembly to complete the assembly of the conveyor.

In operation, the drive motor of the unit is operated to drive the lower drive sprocket and correspondingly drive the rope assembly along the circuitous path at a speed in the range of 700 to 750 feet per minute. The upper sprocket may also serve as the drive sprocket. The material to be conveyed is then gravity fed into the hopper which guides it to the lower end of the lower housing assembly where it is intercepted and transported by the disc assemblies of the rope assembly. The high speed of the rope assembly causes both air and material to be displaced thus enhancing the conveying process. Material reaching the upper end of the unit is caused to be propelled by centrifugal force through conduit section 35 and be discharged through spout 46. The feed rate into the lower housing assembly may be regulated by adjusting the height of baffle plate 31.

Whenever there is a breakage along the rope assembly, the assembly may be removed from the conveyor and strung out, the damaged section may be removed simply by removing the rivets at a disc assembly separating the disc and boss and sawing through a ferrule at its midpoint, and then inserting the new section in a manner as previously described. The annular grooves in the flange sections of the ferrules not only guide the blade of the cutting tool, provide a cut along a plane disposed perpendicular to the longitudinal axis of the ferrule and assure the required distances between disc assemblies but further minimize the time and effort in cutting through the ferrule because the precut groove reduces the total thickness of the metal which must be sawed. Such ferrule construction provides greater pull through resistance while providing for minimal time and effort in cutting through the ferrule. The diameter and thickness of the flange section of the ferrule and the depth and width of the annular groove in such section may be designed to provide for a maximum groove depth consistent with a sufficient pull through resistance of the ferrule.

Although the conveyor as described is provided with a lower housing assembly having material feeding means, an upper housing assembly having a material discharging means and a pair of straight tubular members interconnecting the upper and lower housing assemblies, it is to be understood that there can be a number of variations of such configuration within the scope of the invention. The unit may vary by providing two end housing assemblies and one or more intermediate housing assemblies provided with sprockets for guiding or driving the rope assembly, the tubular members maybe straight or bent, the material feeding means may be located in either end housing assembly, the material discharging means can be located at any housing assembly or at one or more locations along the interconnecting tubing, and the housing assemblies can be located at any desired locations relative to each other.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A rope assembly for a mechanical bulk material conveyor having at least two sprockets each provided with a circular guide surface about which said assembly may be trained and a plurality of circumferentially spaced recesses for receiving spaced flights of said assembly, comprising:
    a rope adapted to be trained about said circular guide surfaces of said sprockets;
    a rope ends connecting flight and a plurality of intermediate flights secured to and spaced along said rope at intervals corresponding to the accurate spacing between said recesses of said sprockets whereby as a segment of said rope rides over one of said sprockets, successive flights secured thereto will be received in successive recesses in said sprocket; and
    each of said intermediate flights including a ferrule having a main body section receiving a portion of said rope therethrough and being firmly secured thereto and a flange section provided with a recess in an edge thereof, a disc member having an opening receiving a portion of said rope therethrough, a boss member having an opening receiving a portion of said rope therethrough, the opening in at least one of said disc and boss members having a first enlarged section receiving a portion of said ferrule main body section therein and a second enlarged section receiving at least a portion of said ferrule flange section therein, and means for firmly securing said disc and boss members together with said ferrule interposed therebetween.

2. A rope assembly according to claim 1 wherein the rope receiving openings in each of said disc and boss members are provided with said first and second enlarged sections.

3. A rope assembly according to claim 1 wherein the rope receiving opening in said disc member includes said first and second enlarged sections.

4. A rope assembly according to claim 1 wherein the rope receiving opening in said boss member includes said first and second enlarged opening sections.

5. A rope assembly according to claim 1 wherein said flange section of said ferrule includes a peripheral surface engageable with a surface of a tool for firmly securing said ferrule to said rope to facilitate the spacing of said ferrules on said rope.

6. A rope assembly according to claim 5 wherein said peripheral surface lies in a plane disposed perpendicular to a longitudinal axis of the main body section of said ferrule.

7. A rope assembly according to claim 5 wherein said peripheral surface of said flange section is engageable with a surface of a tool for firmly securing said ferrule to said rope by crimping.

8. A rope assembly according to claim 1 wherein the flange section of said ferrule is disposed in a position intermediate the ends of said ferrule main body section.

9. A rope assembly according to claim 1 wherein said connecting flight includes first and second ferrules each having a main body section receiving a portion of said rope therethrough and being firmly secured thereto and at least one thereof having a flange section, a disc member having an opening receiving a portion of said rope therethrough, a boss member having an opening receiving a portion of said rope therethrough, the opening in at leat one of said disc and boss members having a first enlarged section receiving a portion of one of said main body sections therein and a second enlarged section receiving at least a portion of said ferrule flange section therein, and means for firmly securing said disc and boss members together with said ferrules interposed therebetween.

10. A rope assembly according to claim 1 wherein said rope is formed of a metal.

11. A rope assembly according to claim 10 wherein said metal is steel.

12. A rope assembly according to claim 10 wherein said rope is coated with a flexible protective material.

13. A rope assembly according to claim 1 wherein said rope consists of a nylon coated steel wire rope.

14. A rope assembly according to claim 1 wherein each of said ferrules is formed of a metal.

15. A rope assembly according to claim 14 wherein said metal is steel.

16. A rope assembly according to claim 14 wherein said metal is aluminum.

17. A rope assembly according to claim 1 wherein each of said disc and boss members are formed of a thermoplastic material.

18. A rope assembly according to claim 1 wherein each of said disc and boss members is formed of a material selected from a group consisting of nylon, polyurethane and polyester.

19. A rope assembly according to claim 1 wherein a portion of said ferrule main body section is received in an enlarged opening section of one of said disc and boss members, and said ferrule flange section is received in an enlarged opening section of the other of said disc and boss members.

20. A rope assembly according to claim 1 wherein an end surface of said flange section of said ferrule includes a peripheral groove.

21. A rope assembly according to claim 1 wherein said ferrule includes a peripheral groove lying in a plane disposed substantially perpendicular to the longitudinal centerline of the rope receiving opening therein.

22. A rope assembly recording to claim 21 wherein said groove is disposed in a peripheral edge of said flange section of said ferrule.

23. A rope assembly according to claim 22 wherein said groove is annular.

* * * * *